United States Patent [19]

Nakano

[11] Patent Number: 4,943,183
[45] Date of Patent: Jul. 24, 1990

[54] WIRE CLAMP

[75] Inventor: Yoshihito Nakano, Kasugai, Japan

[73] Assignee: Kitagawa Industries, Co., Ltd., Aichi, Japan

[21] Appl. No.: 379,201

[22] Filed: Jul. 13, 1989

[30] Foreign Application Priority Data

Aug. 10, 1988 [JP] Japan .............................. 63-106128[U]

[51] Int. Cl.$^5$ ................................................ F16L 3/08
[52] U.S. Cl. ................................. 403/406.1; 403/245; 24/297; 24/463; 248/74.3; 248/316.7
[58] Field of Search ............... 403/406.1, 245; 24/463, 24/297; 248/74.2, 74.3, 316.7

[56] References Cited

U.S. PATENT DOCUMENTS

| | | | |
|---|---|---|---|
| 2,058,733 | 10/1936 | Smith | 248/74.2 |
| 3,154,281 | 10/1964 | Frank | 248/74.2 |
| 4,437,633 | 3/1984 | André | 248/68 R |
| 4,566,660 | 1/1986 | Anscher et al. | 24/453 |
| 4,655,424 | 4/1987 | Oshida | 248/74.2 |
| 4,681,288 | 7/1987 | Nakamura | 24/453 |
| 4,840,334 | 6/1989 | Kikuchi | 248/74.2 |

FOREIGN PATENT DOCUMENTS

| | | | |
|---|---|---|---|
| 2807119 | 8/1979 | Fed. Rep. of Germany | 248/74.2 |
| 1401899 | 4/1965 | France | 248/74.2 |
| 645168 | 9/1985 | Japan . | |
| 63-19450 | 5/1988 | Japan . | |
| 739996 | 8/1988 | Japan . | |
| 749434 | 8/1988 | Japan . | |
| 1068906 | 5/1967 | United Kingdom . | |
| 1459662 | 12/1976 | United Kingdom . | |
| 2191241 | 5/1987 | United Kingdom . | |

Primary Examiner—Randolph A. Reese
Assistant Examiner—Franco S. DeLiguori
Attorney, Agent, or Firm—Oliff & Berridge

[57] ABSTRACT

The wire clamp of this invention is fixed to a mounting board by resilient engaging portions that extend from a base at the end of a post and spread out in a mounting hole in the mounting board. While the wire clamp is thus secured, it holds wires in its wire receiving portions. The wires are supported at a predetermined interval on the mounting board. This wire clamp is easily mounted by pushing struts toward the post with one's finger tips. The pushed struts resiliently deform, pulling up the ends of beams, which descend toward the resilient engaging portions, until the beams are almost horizontally aligned along the mounting board. The resilient resistance of the beams is reduced accordingly, which facilitates the insertion of the resilient engaging portions. Since the post, the struts, the beams, and the wire-receiving portions almost form a square, the wire clamp is rigid, and can firmly secure the wires. If an impact load hits the wires or the wire clamp, either of the struts can bend to absorb the impact load. Consequently, this wire clamp has both rigidity and impact resistance. This wire clamp is particularly useful for holding anode wires from a cathode-ray tube.

6 Claims, 2 Drawing Sheets

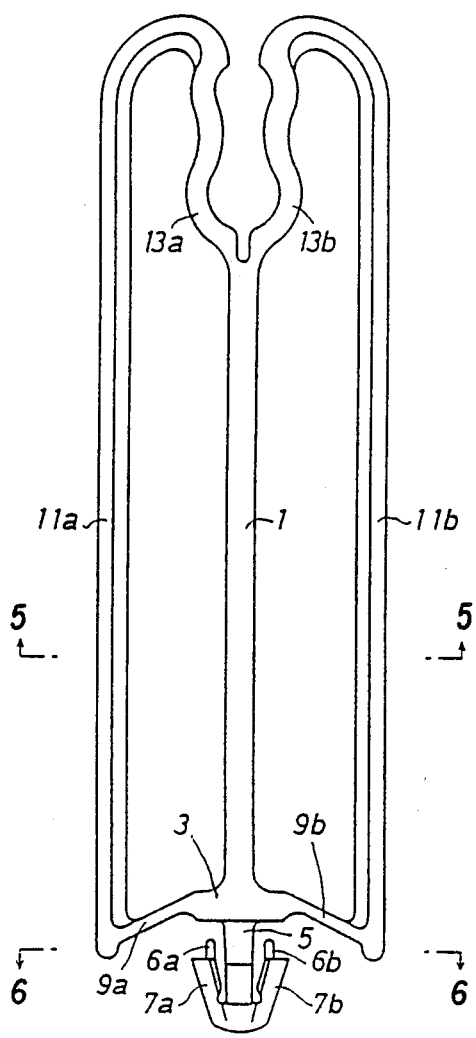
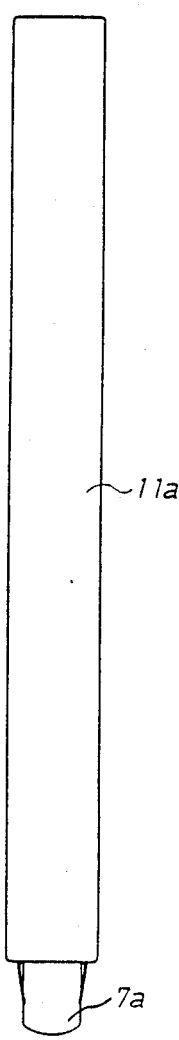
FIG. 1
FIG. 2
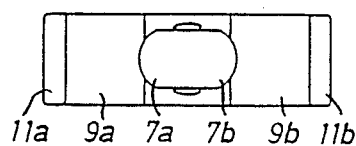
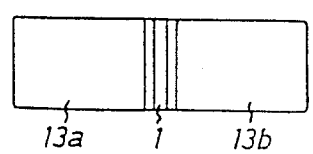
FIG. 3
FIG. 4

WIRE CLAMP

BACKGROUND OF THE INVENTION

This invention relates to a wire clamp that holds a wire in place on a mounting board. This wire clamp is particularly useful for holding anode wires from a cathode-ray tube.

A related-art wire clamp is shown in FIG. 9. The related-art wire clamp 100 comprises a support 102, a resilient anchor arm 104 extending from the support 102, a wire-receiving portion 106 for receiving a wire (not shown), and a support member 108 for contacting a mounting board (not shown) and supporting the wire. By inserting the resilient anchor arm 104 into a mounting hole in the mounting board, the mounting board is secured between the support member 108 and the upper ends 104a of the resilient anchor arm 104.

However, when the resilient anchor arm 104 is attached to the mounting board, the support member 108 should be resiliently deformed in a direction shown by arrow a.

Furthermore, the support member 108 is deformed in a direction shown by arrow a by a mounting force applied in a direction shown by arrow b toward the mounting board. However, the support member 108 is so rigid that it will not deform enough to allow the anchor arm 104 to engage the mounting board. Consequently, the wire clamp 100 is difficult to mount on the mounting board, because great force is required.

If a large lateral load is applied to the wire and the wire clamp 100, the support member 108 yields to the load and breaks.

SUMMARY OF THE INVENTION

The object of the present invention is to solve these problems by providing an easily mounted, durable wire clamp.

This object is achieved by this invention, which provides a wire clamp, as shown in FIGS. 1 through 8, for holding a wire (15) in place on a mounting board (21), comprising: a central support member (1); an anchoring member (5) that extends from a support base (3) of the central support member (1) and that has resilient engaging members (6a,6b,7a,7b) that pass through and spread out in a mounting hole (23) in the mounting board (21); side support members (11a,11b) on both sides of and parallel to the central support member (1); transverse support members (9a,9b) descending from both sides of the support base (3) of the central support member (1) toward the resilient engaging members (6a,6b,7a,7b), and connecting to one end of each side support member (11a,11b); and a wire-receiving member including opposed portions (13a,13b) connecting the other ends of the side support members (11a,11b) with the central support member (1) for receiving the wire (15).

DESCRIPTION OF THE DRAWINGS

By way of example and to make the description clearer, reference is made to accompanying drawings in which:

FIG. 1 a front view of an anode wire clamp according to one embodiment of the present invention;

FIG. 2 is a side view of FIG. 1;

FIG. 3 is a bottom plan view of FIG. 1;

FIG. 4 is a top plan view of FIG. 1;

FIG. 8 illustrates one application of the anode wire clamp; and

FIG. 9 is a front view of a related-art anode wire clamp.

DESCRIPTION OF THE PREFERRED EMBODIMENT

Figure 5:
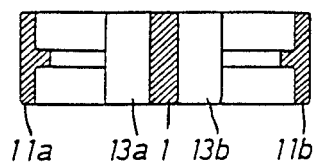
FIG. 5 is a sectional view seen from the bottom, in which the section is taken along line 5—5 in FIG. 1.

This is a description of the embodiment of the present invention shown in the drawings.

Figure 7:
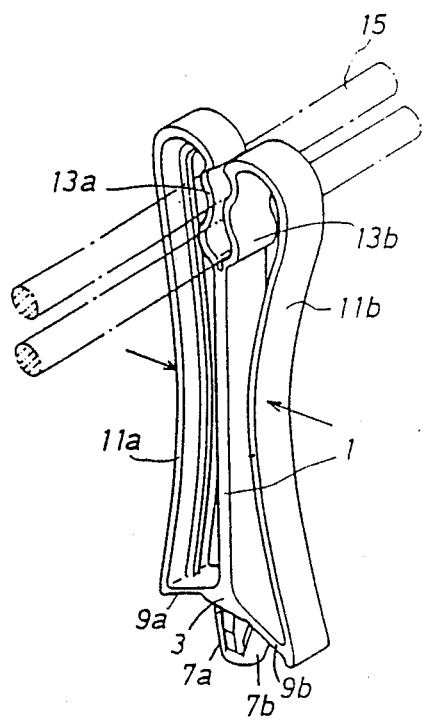
FIG. 7 is a perspective view of the anode wire clamp.
Figure 6:
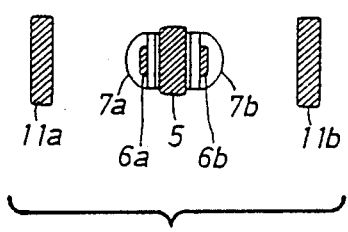
FIG. 6 is a sectional view seen from the top, in which section is taken along line 6—6 in FIG. 1.

As shown in FIG. 1, a post 1 and a base 3 are molded as a single piece. An anchor 5 extends from the underside of the base 3. A pair of resilient anchor arms 7a and 7b slant up and away from the free end of the anchor 5. Engaging portions 6a and 6b are formed at the ends of the anchor arms 7a and 7b. Beams 9a and 9b extend outwardly and downwardly from both sides of the base 3 past the anchor arms 7a and 7b. As shown in FIG. 3, the beams 9a and 9b join with struts 11a and 11b and form a single piece. As shown in FIGS. 5 and 6, the struts 11a and 11b run parallel to and on both sides of the post 1. As shown in FIG. 5, the struts 11a and 11b are connected with the post 1 through wire-receiving portions 13a and 13b. As shown in FIG. 7, the wire-receiving portions 13a and 13b are curved to receive two anode wires 15.

The application of the anode wire clamp is now explained with reference to FIGS. 7 and 8.

When this anode wire clamp is mounted on a mounting board 21, the struts 11a and 11b are resiliently bent by pushing both sides of the struts 11a and 11b toward the post 1 with one's finger tips as shown by arrows in FIG. 7. As shown in FIG. 8, when the struts 11a and 11b are pushed, the lower ends of the struts 11a and 11b are pulled up in a direction shown by an arrow c, and the beams 9a and 9b are resiliently bent to be almost horizontally aligned along the mounting board 21. When the resilient anchor arms 7a and 7b are inserted in a mounting hole 23, the resilient anchor arms 7a and 7b are first compressed, then spread out, and fit in the mounting board 21. By pushing the anode wires 15 into the wire-receiving portions 13a and 13b, the anode wires 15 are held in place between the wire-receiving portions 13a and 13b, as shown in FIGS. 7 and 8.

The anode wire clamp for this embodiment can be easily mounted on the mounting board 21 by pushing the sides of the struts 11a and 11b with one's finger tips. When the sides of the struts 11a and 11b are pushed, he ends of the struts 11a and 11b are pulled up toward a direction shown by the arrow c, and the beams 9a and 9b are deformed almost horizontally along the mounting board 21. The resilient resistance of the beams 9a and 9b is thus made smaller than that of the related-art anode wire clamp shown in FIG. 9.

If a lateral force is loaded on the anode wire 15 inserted between the wire-receiving member comprised of opposed portions 13a and 13b, either the strut 11a or 11b can bend. If a large great lateral force hits the anode wire 15, a strut 11a or 11b will bend to absorb part of the lateral force before the post 1 is bent. This anode wire clamp can thus better withstand the impact force.

As shown in FIG. 9, when the related-art wire clamp 100 is loaded with a lateral force or is mounted on the mounting board with a great force, the support member 108 may deform and break due to the force. On the other hand, if the struts 11a and 11b for the present embodiment are deformed excessively, they touch the post 1, which prevents the struts 11a and 11b from being deformed further. The beams 9a and 9b are also protected from deforming excessively and breaking.

Although one specific embodiment of the invention has been shown and described for the purpose of illustration, it should be apparent that the invention is not limited to the embodiment illustrated and described, but in its broadest aspects includes all embodiments and modifications that come within the scope of the claims.

What is claimed is:

1. A wire clamp for holding a wire in place on a mounting board, comprising:
   a central support member having an anchoring member that extends from a support base of the central support member and that has resilient engaging members that pass through and spread out in a mounting hole in the mounting board;
   side support members on both sides of and parallel to the central support member and movable toward the central support member;
   a pair of transverse support members extending angularly from opposed sides of the support base of the central support member toward the resilient engaging members, each transverse support member being connected to one end of an associated one of the side support members;
   a wire-receiving means for receiving wire, the wire receiving means including two opposed portions, each portion connecting the other end of an associated one of the side support members with the central support member.

2. A wire clamp as claimed in claim 1, in which the side support members are resilient so as to raise and horizontally flatten the horizontal support members when the side support members are squeezed.

3. A wire clamp as claimed in claim 1, in which the side support members deform to absorb lateral loads.

4. A wire clamp as claimed in claim 1, in which the transverse members push against the mounting board to hold the resilient engaging members securely in the mounting hole.

5. A wire clamp as claimed in claim 1, in which the wire-receiving means can bear a plurality of wires.

6. A wire clamp as claimed in claim 1, in which the wire secured in the wire-receiving means is an anode wire for a cathode-ray tube.

* * * * *